United States Patent [19]
Schooley et al.

[11] Patent Number: 5,890,645
[45] Date of Patent: Apr. 6, 1999

[54] CONTINUOUS FEED WIRE UNCOILER

[75] Inventors: Charles Schooley, Rockford; Lyle S. Strombeck, Rockton; Michael J. Yankaitis, Roscoe, all of Ill.

[73] Assignee: Rockford Manufacturing Group, Inc., South Beloit, Ill.

[21] Appl. No.: 869,488

[22] Filed: Jun. 5, 1997

[51] Int. Cl.[6] .............................. B23K 31/02; B23K 37/04
[52] U.S. Cl. ........................... 228/173.5; 228/5.7; 228/45
[58] Field of Search ................................ 228/5.7, 13, 45, 228/173.5, 231; 29/868, 869

[56] References Cited

U.S. PATENT DOCUMENTS

| | | | |
|---|---|---|---|
| 1,063,504 | 6/1913 | Burrows | 228/13 |
| 3,303,315 | 2/1967 | Smith et al. | 228/13 |
| 3,949,790 | 4/1976 | Rass et al. | 242/129 |
| 4,367,839 | 1/1983 | Angerer | 228/5.7 |
| 4,512,533 | 4/1985 | Morival et al. | 242/129 |
| 4,917,285 | 4/1990 | Shosie | 228/5.7 |

OTHER PUBLICATIONS

Rockford Manufacturing Advertisements U1 – U4 (Revised Mar. 15, 1992).
Rockford Manufacturing Advertisements US – U6 (Revised Aug. 10, 1995).

*Primary Examiner*—Patrick Ryan
*Assistant Examiner*—Carlos J. Gamino
*Attorney, Agent, or Firm*—Leydig, Voit & Mayer, Ltd.

[57] ABSTRACT

An apparatus for continuously feeding the wire to a wire cutting apparatus. The present invention provides a pair of mandrels provided in an in-line configuration and provided on a turntable. An active coil is loaded onto one of the mandrels while a idle coil is loaded onto the other mandrel. As the wire is being pulled to the wire cutting apparatus from the active coil the tail end of the active coil is bent into abutting relationship with the lead end of the idle coil and welded together. As a result, when the active coil is exhausted, the pulling force of the cutting machine enables the carousel to rotate so that the idle coil assumes the active position and the new coil can be loaded onto the now idle coil for a continuous feed of wire to the wire cutting apparatus.

11 Claims, 4 Drawing Sheets

Cut-off Assembly

CONTINUOUS FEED WIRE UNCOILER

FIELD OF THE INVENTION

The present invention generally relates to the wire cutting machines, and more particularly relates to mechanisms for feeding wire to a wire cutting machine.

BACKGROUND OF THE INVENTION

Wire or cable is typically provided from a foundry in a form of a spool or coil having a predetermined number of lineal feet. Such a configuration allows for relatively easy storage and transportation of the wire, but it is often necessary to reduce the coil wire into individual lengths of straight wire for commercial purposes and ultimate use. The coils of wire are therefore often fed into a machine which not only cuts the wire into shorter strips, but also reduces the twist or curvilinear shape which the wire tends to assume due to being coiled. Such a system is disclosed in copending application Ser. No. 08/627935, which has been allowed but currently no patent number has been assigned, to the present assignee, and expressly incorporated by reference herein.

With such a system, the coil is placed onto an uncoiling mechanism which is either driven to feed the lead end of the coil to the wire cutting apparatus, or which is rotatable to allow the lead end of the coil to be pulled to the wire cutting machine, and thereby allow the coil to rotate on the uncoiler. With many systems, once the coil is exhausted, the wire cutting machine is temporarily inoperable as a new coil must be loaded onto the uncoiler.

As with many volume production processes, this period of downtime directly relates to a loss in production and thus loss in profits. Various attempts have been devised to provide a means of continuously feeding the wire to a wire cutting apparatus and thereby avoiding downtime. One such example is provided in a Z-shaped configuration having parallel mandrels mounted on a turntable. A wire coil is placed on one mandrel and the lead end of the coil is pulled to a wire cutting apparatus. As the wire is being pulled, the tail end of the active coil is positioned to be in abutting relationship with the lead end of the idle coil placed on the other mandrel. The tail end of the active coil and the lead end of the idle coil are then welded together and when the active coil is exhausted, the pulling force of the cutting machine causes the carousel to rotate and thereby makes the idle mandrel the active mandrel when the active coil is exhausted. The process then can be continued by loading another coil onto the now idle mandrel and continuing the welding process.

Although such a system successfully avoids periods of downtime, it necessarily requires a means by which the tail end of the active coil and lead end of the idle coil can be physically manipulated to be in abutting relationship for the welding to take place. Given the fact that these coils are often in excess of 2 tons in weight, and the coils are often exhausted in a period of twenty minutes, the operators of the system are forced to manually position the coils which is often beyond the physical abilities of the average operator. Even if the operator is extraordinarily strong and quick, periods of downtime can be encountered if the slightest of delays are allowed to occur or if an operator of less extraordinary strength is operating the machine.

SUMMARY OF THE INVENTION

It is the primary aim of the present invention to provide a mechanism to continuously feed wire to a wire cutting apparatus which is quick, substantially automated, and which minimizes the likelihood of downtime.

It is of an objective of the present invention to provide a mechanism for continuously feeding wire to a wire cutting apparatus which minimizes the manual labor required for positioning and welding the lead and tail ends of the idle and active coils, respectively.

It is another objective of the present invention to provide a mechanism for feeding wire to a wire cutting apparatus which is not dependent on an extraordinarily strong operator, but rather provides machine power and automation to substantially perform the operation.

It is the further objective of the present invention to provide a mechanism for feeding wire to a wire cutting apparatus which is able to continuously provide wire to a wire cutting apparatus over a range of wire gauges ranging from $5/8$" to $1 1/8$", and 4,000 lbs to 6,000 lbs.

It is a feature of the present invention to accomplish the foregoing by providing a continuous feed wire uncoiler in the form of two in-line mandrels mounted on a rotatable carousel, wherein the mandrels are driven and provided with powered feed head assemblies for automatically directing the lead and tail ends of the coils to a bending and welding apparatus. The bending and welding apparatus is adapted to bend the tail and lead ends of the coils into abutting relationship to enable the wire apparatus to create a weld between the two coils. Therefore, after the active coil is exhausted, the pulling force of the cutting machine is able to rotate the carousel and thereby allow the formerly idle coil to assume the active coil position. The entire process can then be repeated. It is another feature of the present invention to provide a method for continuously feeding wire to a wire cutting apparatus comprising the steps of drawing the lead end of an active wire coil from a driven mandrel to a wire cutting machine, automatically feeding the tail end of the active coil to a bending and welding mechanism during the drawing step, automatically feeding the lead end of an idle coil to the bending and welding mechanism during the drawing step, bending the tail end of the active coil and the lead end of the idle coil into abutting relationship using the bending and welding mechanism during the drawing step, and welding the tail end of the active coil to the lead end of the idle coil during the drawing step, so that the idle coil is drawn to the cutting machine when the active coil is exhausted, the carousel rotates due to the drawing step such that the idle coil assumes the position of the active coil, and the active mandrel assumes the position of the idle mandrel.

These and other objectives and advantages of the present invention will become more apparent from the following detailed description when taken in conjunction with the accompanying drawings.

Figure 1:
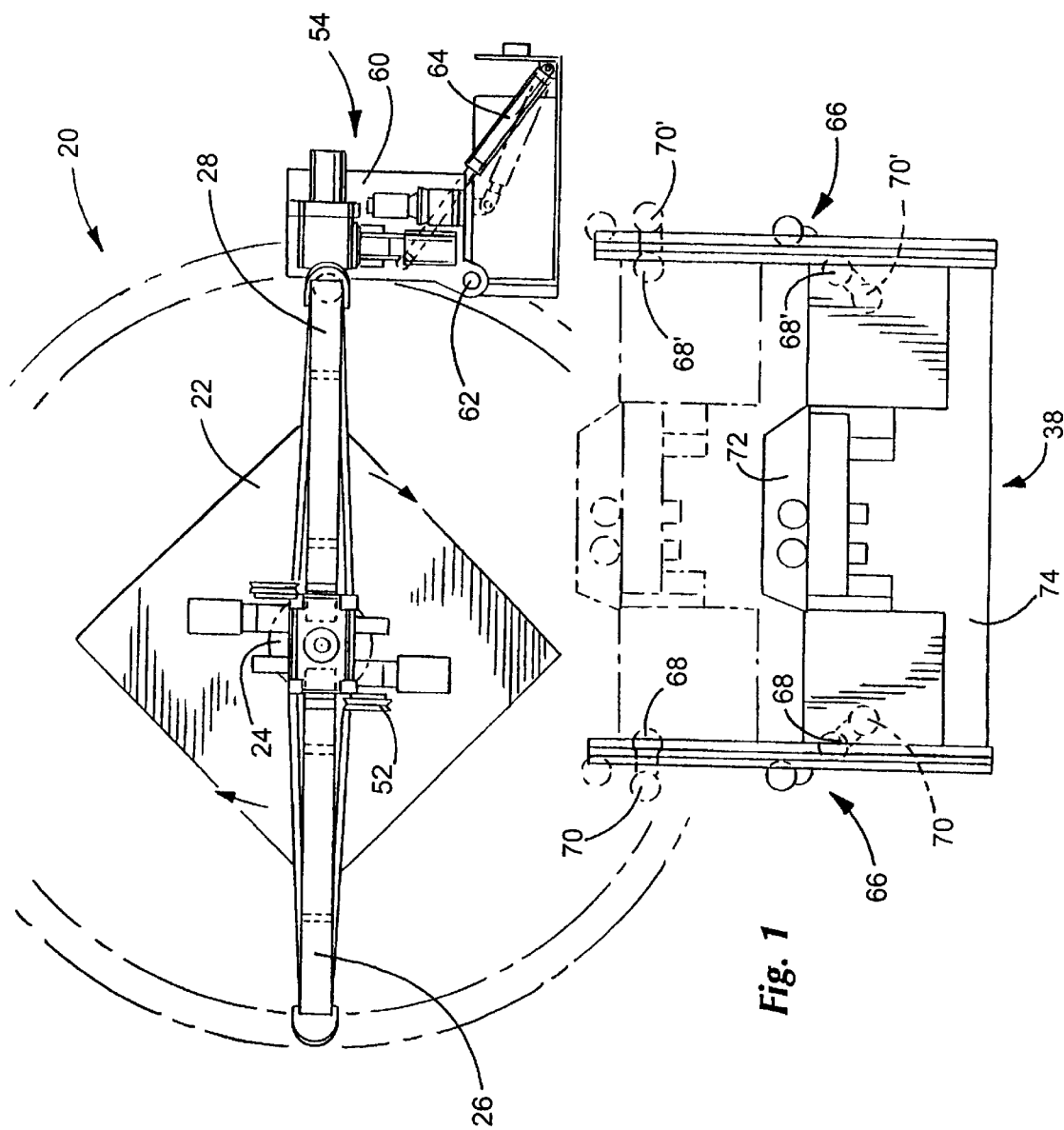
FIG. 1 is a plan view of the present invention with the active and idle mandrels being unloaded, and the welding apparatus shown in both the active and retracted positions.

While the present invention is susceptible of various modifications and alternative constructions, certain illustrative embodiments thereof have been shown in the drawings and will be described below in detail. It should be noted, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

As referred to in the background of the invention, the avoidance of even the slightest amounts of downtime can result is substantial cost savings to manufacturers of cut wire strips as well as to the ultimate consumers of the wire strips. Any time which need not be devoted to reloading the uncoiler to the wire cutting apparatus is therefore time which the wire cutting machine is producing saleable product. The present invention therefore provides a continuous feed wire and coiler as best shown in overall configuration in FIG. 1.

As shown in FIG. 1, uncoiler 20 is shown having a turntable or carousel 22 to which a central support 24 is mounted for rotation. It is to be understood that any variety of mounting means can be employed for the rotational mount including conventional ball bearings. Mounted perpendicularly to central support 24 and protruding in diametrically opposed directions on central support 24, are active mandrel 26, and idle mandrel 28. Each mandrel 26 and 28 is adapted to support individual coils of wire, as will be described with further detail herein.

Figure 3:
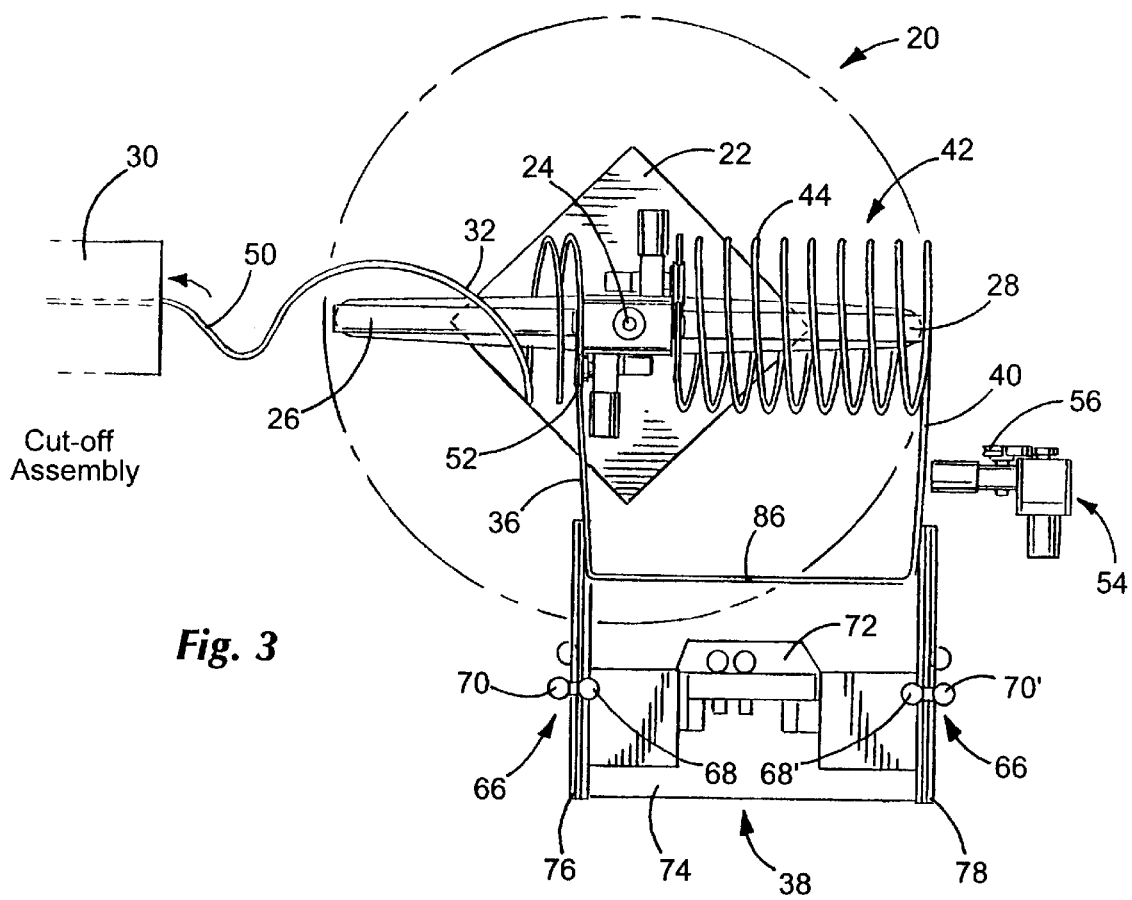
FIG. 3 is a schematic view of the present invention after the coils have been welded together.
Figure 4:
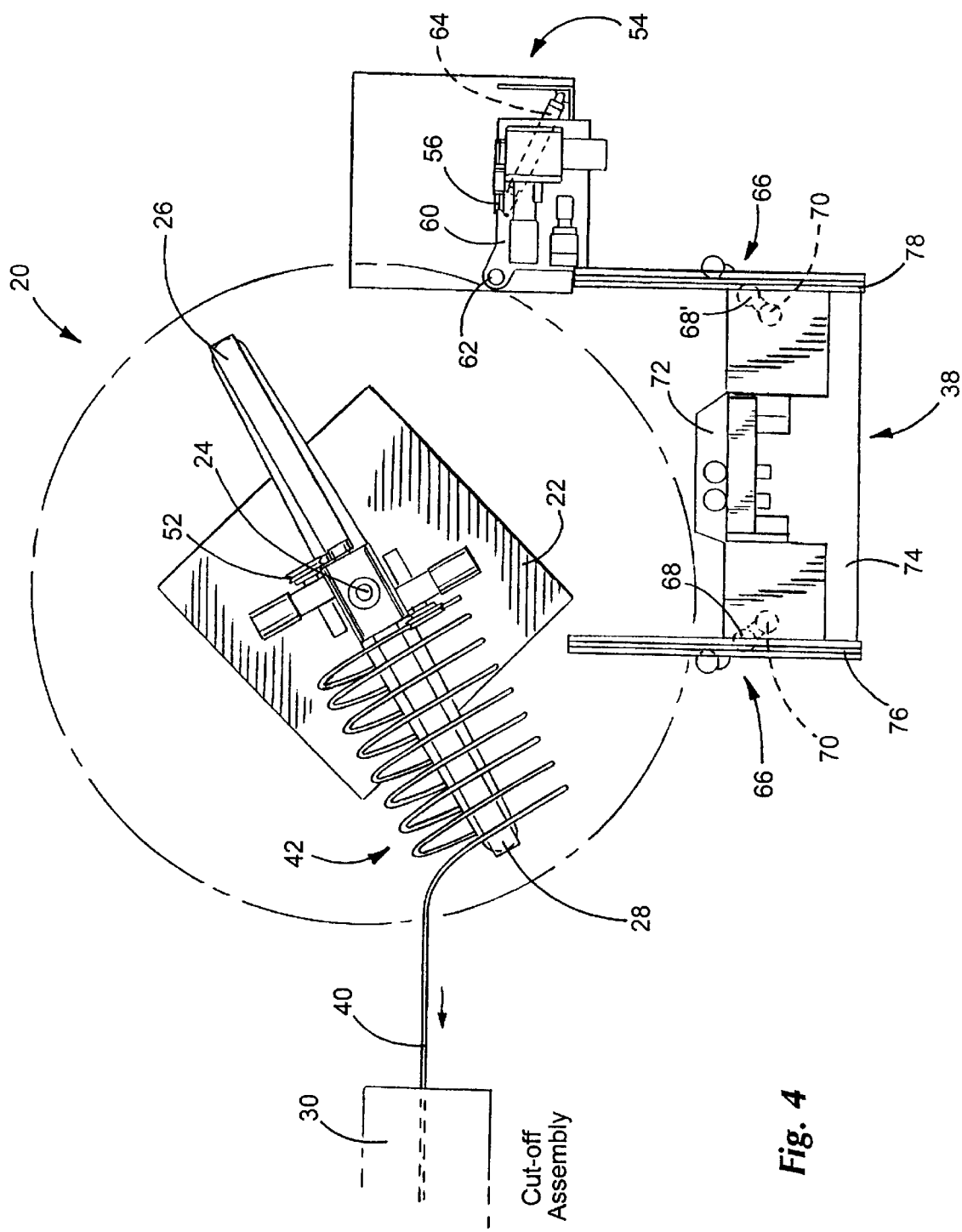
FIG. 4 is a schematic view of the present invention after the active coil has been exhausted and the idle coil is rotated into the active position.
Figure 5:
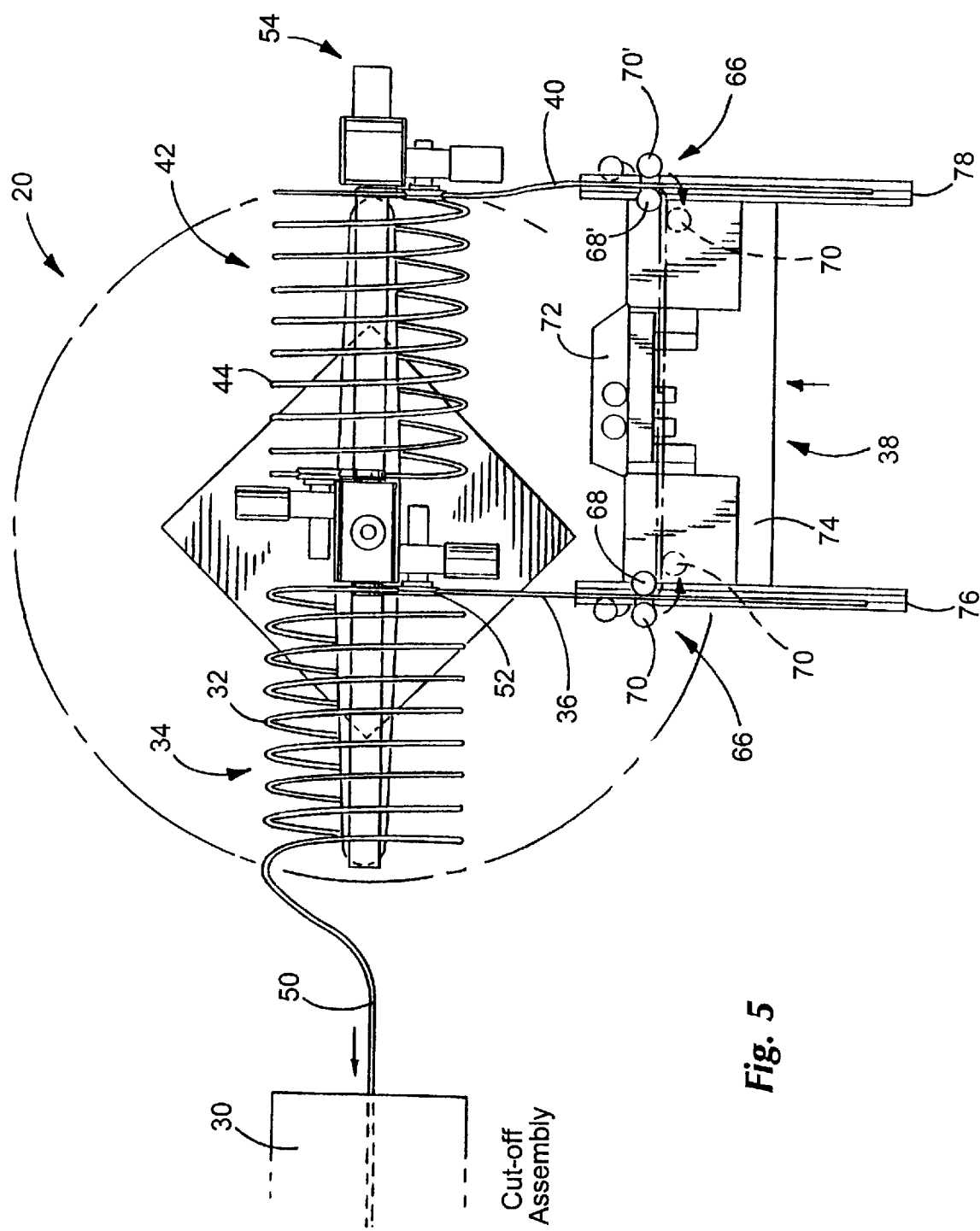
FIG. 5 is a schematic view of the present invention showing a new coil having been loaded onto the idle mandrel and the welding and bending mechanism into position to weld the lead end of the idle coil to the tail end of the active coil.

By means of overview, it is sufficient to say that as shown in FIGS. 3–5, mandrel 26 and 28 are adapted to receive coils of wire which can be fed to a wire cutting apparatus schematically shown at 30. As wire cutter 30 pulls wire 32 from active coil 34, the tail end 36 of coil 34 is fed to welding and bending apparatus 38. Similarly, lead end 40 of idle coil 42 is also fed to welding and bending apparatus 38. After sufficient lengths of wire from both the active coil 34 and idle coil 42 are fed to the welding and bending apparatus 38, (approximately 4 feet in the preferred embodiment), active wire 32 and idle wire 44 are bent into abutting relationship to allow the welding and bending apparatus 38 to weld the two ends together. Since the two coils are then basically one unitary length, when active coil 34 is exhausted from mandrel idle mandrel 28 can rotate into the position of the active mandrel about carousel 22 due to the pulling force of the wire cutting apparatus 30. The formerly active mandrel 26 therefore assumes the position of the idle mandrel 28 and is adapted to receive a new coil to perform the identical procedures once again. This operation can be performed continuously to thereby provide a continuous stream of wire to wire cutting apparatus 30, and thereby minimize, if not eliminate, the potential for machine downtime.

Now referring to the drawings, for a more specific description of each aforementioned element, attention is drawn toward FIG. 3. As shown therein, active mandrel 26 is a substantially cylindrical body, with wire cutting apparatus 30 being provided with a pair of driven rollers which grip the lead end 50 of active coil 34 and pull the wire under compression to the wire cutting mechanism.

Figure 2:
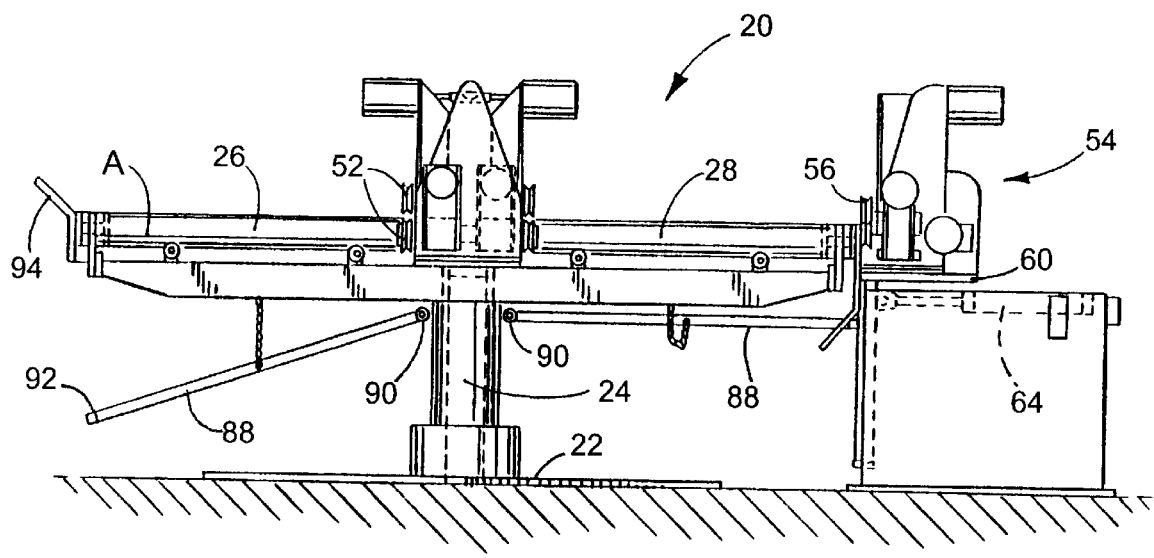
FIG. 2 is a side view of the present invention shown in FIG. 1.

In order to provide a mechanism to smoothly uncoil the wire one coil at a time while holding the bulk of the wire on the mandrel, the present invention provides a restraining bar 88 below each mandrel, and an outboard bearing pad 94 at the end of each mandrel. As shown in FIG. 2, in the active position restraining bar 88 is allowed to pivot about point 90 such that lead end 92 is moved downward and nonparallel with the mandrel. Since the restraining bar 88 is as long as the mandrel, the wire coil will be substantially held in position. However when a new coil needs to be loaded on to the idle mandrel 28, restraining bar 88,is brought into the upright or parallel position so that the inner diameter of the new coil can fit around the idle mandrel 28 and restraining bar 88. Outboard bearing pad 94 as used to provide for smooth disbursement of the wire one coil at a time by directing lead end 50 from active mandrel 26 to wire cutting apparatus 30.

As wire 32 is being removed from active mandrel 26, tail end 36 is fed to welding and bending apparatus 38. This is accomplished through a pair of beveled rollers 52 which are driven by a motor. In the preferred embodiment an electric motor is employed, but it is to be understood that other prime movers could be utilized as well. With prior art systems, the tail end of an active coil would have to be manually pulled from the coil and bent into abutting relationship with the lead end of an idle coil for the ends to be welded together. Considering the substantial weight of these coils, this process was extremely difficult and requires excessive amounts of manual labor. One of the inventive features of the present invention is therefore to automatically feed the tail end 36 of the active coil to a welding and bending apparatus 38 and to similarly feed the lead end 40 of idle coil 42 to welding and being apparatus 38. This is accomplished, for example by having an operator manually position tail end 36 of active coil 34 between the beveled rollers 52. When the motor is activated, rollers 52 begin to rotate and through compression grip tail end 36 and pull wire 32 toward welding and bending apparatus 38.

A similar procedure is then performed on the idle coil. First, a new coil of wire is loaded onto idle mandrel 28 in a conventional manner. Swingable feed head assembly 54 is then swung into position as best shown in FIG. 5 such that driven rollers 56 of swingable feed head assembly 54 are adjacent lead end 40 of idle coil 42. An operator can then manually position the lead end 40 between driven rollers 56, and when a motor is activated, driven rollers 56 will pull lead end 40 by compression therebetween and to welding and bending apparatus 38. Swingable feed head assembly is provided on platform 60 which is adapted to pivot about point 62 at the direction of hydraulic rams 64. Specifically, hydraulic ram 64 is extended when it is desired to have swingable feed head assembly 54 adjacent idle coil 42, and hydraulic ram 64 is retracted by the desire to load a new coil onto idle mandrel 28.

It can therefore be seen that as lead end 50 of active coil 34 is being pulled to wire cutting apparatus 30, its tail end 36 can be feed to welding and bending apparatus 38 as can lead end 40 of idle coil 42. In order for the ends to be welded together, they must first be bent into abutting relationship. This is accomplished by another inventive feature of the present invention which is provided in the form of a pair of bending assemblies 66. Each bending assembly 66 consists of a pivot roller 68 and an orbiting roller 70 wherein orbiting roller 70 is adapted to orbit about pivot roller 68 as best shown in a comparison between FIG. 3 and FIG. 5. For example, lead end 40 of idle coil 42 will be directed between pivot roller 68' and orbiting roller 70'. After a length of wire has passed between pivot roller 68' and orbiting roller 70' (approximately 4 feet in the preferred embodiment), orbiting roller 70' will move in an arc about pivot roller 68' to produce a 90° degree bend in the wire. Similarly, orbiting roller 70 is adapted to orbit pivot roller 68 to bend tail end 36 of active coil 34. After both 90° degree bends have been performed, tail end 36 and lead end 40 will be in abutting relationship and in position to be welded together. Any conventional means is capable of being used for moving orbiting rollers 70 and 70', with hydraulic force being used in the preferred embodiment.

After the bending process, the present invention provides welding mechanism 72 to weld tail end 36 to lead end 40. In a preferred embodiment, the welding mechanism 72 not only welds the ends together, but also anneals the metal to temper and toughen the joint.

As best shown in FIG. 5, welding and bending apparatus 38 is provided on a platform 74 which is adapted for linear movement along rails 76 and 78. Front and rear axles are provided with pairs of grooved wheels which are shaped to ride along rails 76 and 78. In one embodiment, platform 74 is moved in and out manually, while in other embodiments it is contemplated that a means can be provided for automatically providing the inward and outward movement of platform 74.

After the weld 86 (see FIG. 3) has been created and annealed, operators physically lift the wire from between the pivot orbiting rollers, to allow the platform 74 to be moved backward. In an alternative embodiment, platform can be configured so as to automatically rise and lower and thereby move into and out of engagement with the wire. As best shown in FIG. 3, this will therefore result in a configuration wherein the active coil 34 and idle coil 42 are physically jointed together and once active coil 34 is exhausted, the pulling force of wire cutting apparatus 30 will begin to pull on lead end 40 of idle coil 42 and cause carousel 22 to rotate. The idle coil 42 will therefore become the active coil and what was previously the active mandrel 26 will be empty and rotated into position for the lowering of a new idle coil. The whole process can then be repeated without downtime and with very little required manual labor.

It can therefore be seen that the present invention brings to the art a new mechanism and method for continuously feeding wire to a wire cutting apparatus. The inventive apparatus and present invention reduce, if not eliminate, the downtime of the system, and substantially minimize the amount of manual labor required for loading and unloading the coils. This results in a more automated process, which reduces the overall cost of the wire to the manufacturer and to the ultimate user.

What is claimed is:

1. A material handling apparatus for continuously feeding coiled wire to a wire cutting machine, the material handling apparatus comprising:

a rotatable carousel having an upright support frame adapted to rotate with the carousel;

active and idle mandrels extending substantially perpendicularly from the frame and in diametrically opposed directions, the active and idle mandrels being adapted to receive coils of wire having a lead end and a tail end, the active mandrel adapted to feed the lead end of the wire to a wire cutting machine;

a bending and welding mechanism moveably mounted adjacent the carousel;

a fixed driven feed head assembly mounted to the frame adjacent the active mandrel and adapted to feed the tail end of the active coil to the bending and welding mechanism; and a movable driven feed head assembly movably mounted adjacent the idle mandrel and adapted to feed the lead end of the idle coil to the mechanism for bending and welding, the movable driven feed head assembly adapted to rotate away from the idle mandrel to allow a new coil to be loaded thereon, the bending and welding mechanism being adapted to bend the tail end of the active coil and lead end of the idle coil into abutting relationship and weld the ends together, the welding and bending mechanism adapted to move out of engagement with the wires after the ends are welded together to allow the carousel to rotate 180 degrees when the active coil is exhausted, the idle coil thereby being allowed to become the active coil, and the active mandrel thereby being allowed to become the idle mandrel, and being adapted to receive a new idle coil.

2. The material handling apparatus of claim 1 wherein the feed head assemblies are driven by electric motors.

3. The material handling apparatus of claim 1 wherein the bending mechanism includes a pivot roller and a orbiting roller with a gap therebetween, the gap adapted to receive the wire and the orbiting roller adapted to rotate about the pivot roller to bend the wire.

4. The material handling apparatus of claim 1, wherein the welding mechanism includes a mechanism for annealing the welded wire.

5. The material handling apparatus in claim 1, wherein the fixed and movable feed head assemblies include driven rolls which grip the wire under compression and pull the wire from the coils.

6. A method of continuously feeding wire from an uncoiler having in-line first and second mandrels to a wire cutting machine, the method comprising the steps of repeatedly;

drawing the lead end of an active coil disposed on the first mandrel to the wire cutting machines;

automatically feeding the tail end of the active coil to a bending and welding mechanism during the drawing step;

automatically feeding the lead end of an idle coil disposed on the second mandrel to the bending and welding mechanism during the drawing step;

bending the tail end of the active coil and lead end of the idle coil into abutting relationship using the bending and welding mechanism during the drawing step;

welding the tail end of the active coil to the lead end of the idle coil during the drawing step, the idle coil being drawn to the cutting machine when the active coil is exhausted, the carousel rotating due to the drawing step such that the idle coil assumes the position of the active coil, and the active mandrel assumes the position of the idle mandrel; and loading a new coil onto the idle mandrel.

7. The method claim 6 wherein the automatically feeding steps are accomplished by a pair of driven rollers having a gap therebetween with the gap being adapted to receive the ends of the coils under compression and pull the coils toward the bending and welding mechanism upon rotation.

8. The method of claim 6 wherein the bending step is performed by feeding the ends of the coils between a pivot roller and an orbiting roller, and moving the orbiting roller about the pivot roller to thereby bend the wire.

9. The method of claim 6 further including the step of annealing the wire after the welding step.

10. The method of claim 6 wherein automatically feeding the lead end of the idle coil step is performed by a pair of driven rollers mounted onto a swingable platform adapted to swing into position for feeding the lead end of the idle coil to the bending and welding mechanism, in which is adapted to swing out of position to allow the loading step to be performed.

11. The method of claim 6 wherein the bending and welding mechanism is mounted on a platform which is adapted to move into adjacent relationship with the coils in order for the bending and welding steps to be performed, and which is adapted to move outward to allow the carousel to rotate.

* * * * *